United States Patent

Clardy, Jr.

[11] Patent Number: 5,961,175
[45] Date of Patent: Oct. 5, 1999

[54] VEHICLE CANOPY

[75] Inventor: John L. Clardy, Jr., Colleyville, Tex.

[73] Assignee: ATV Products, Inc., Fort Worth, Tex.

[21] Appl. No.: 08/818,732

[22] Filed: Mar. 14, 1997

[51] Int. Cl.$^6$ .................................................. B62D 25/06
[52] U.S. Cl. ........................... 296/102; 296/77.1; 296/87
[58] Field of Search ................................. 296/77.1, 78.1, 296/79, 86, 87, 88, 92, 96.2, 102

[56] References Cited

U.S. PATENT DOCUMENTS

| | | | |
|---|---|---|---|
| 4,098,536 | 7/1978 | Mills | 296/77.1 |
| 4,773,695 | 9/1988 | Jones et al. | 296/77.1 |
| 5,174,622 | 12/1992 | Gutta | 296/77.1 |
| 5,203,601 | 4/1993 | Guillot | 296/77.1 |

*Primary Examiner*—Andrew C. Pike
*Attorney, Agent, or Firm*—Arthur F. Zobal

[57] ABSTRACT

The canopy has a front and rear frame coupled to a top frame such that the lower edges of the front and rear frames are forward and rearward respectively of the top frame. The front frame has an upper window pane coupled thereto and a lower window pane having its upper edge pivotally coupled to the front frame. A window pane also is provided for the rear frame. Two pairs of flexible windows are provided for the two sides of the canopy. Two seat belt members are connected to the rear frame.

3 Claims, 2 Drawing Sheets

VEHICLE CANOPY

BACKGROUND OF THE INVENTION

Field of the Invention

The invention relates to a canopy for a motor vehicle.

SUMMARY OF THE INVENTION

The invention relates to a canopy having front and rear frames coupled to a top frame such that the lower edges of the front and rear frames are forward and rearward respectively of the top frame. The front frame has an upper window pane coupled thereto and a lower window pane having its upper edge pivotally coupled to the front frame. A window pane also is provided for the rear frame.

A safety belt comprising of two flexible belt members are coupled to the rear frame and are adapted to extend into the space between the front and rear frames.

DESCRIPTION OF THE PREFERRED EMBODIMENT

Figure 1:
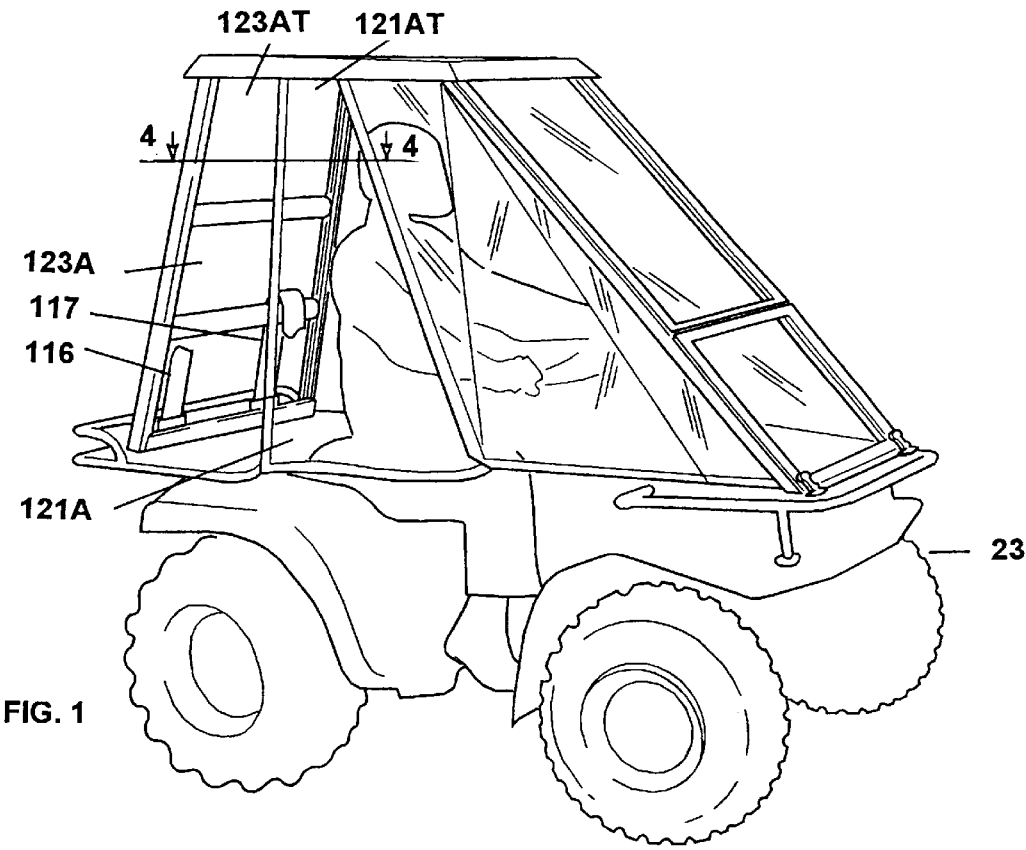
FIG. 1 illustrates the canopy of the invention shown from the right side thereof coupled to a motor vehicle.

Referring now to the drawings, the canopy of the invention is identified at 21. In FIG. 1 it is shown attached to a motor vehicle 23 having four wheels and an open top. The vehicle is of the type driven by an internal combustion engine such as a gasoline engine.

The canopy 21 comprises a top frame 31, a front frame 33 and a rear frame 35. The top frame 31 comprises a frame member 41 having a front edge 43, a rear edge 45 and two side edges 47 and 49 which support a top wall 51. The frame member 41 and top wall 51 are formed of aluminum.

The front frame 33 comprises a frame member 53 having a top edge 55, a bottom edge 57, two side edges 59 and 61 and a cross member 63. Fixedly attached to the frame member 53 is an upper window pane 65 and a lower window pane 67 having its upper edge 67U pivotally attached to the lower edge 65L of the window pane 65 by way of hinges 69. The lower portion of the window pane 67 has two clamps 71 adapted to be releasably coupled to the frame edge 57 when the pane 67 is in a downward closed position or to two hook members 73 when in an upward open position.

The frame member 53 is formed of aluminum. The window panes 65 and 67 are formed of transparent plastic preferably a polycarbonate.

The top edge 55 of the front frame 33 is attached to the front edge 43 of the top frame member 41 with bolts such that the angle between the plane of the top frame 31 and the plane of the front frame 33 is about 45 degrees.

Two front side window panes 81 and 83 have their front edges 81F and 83F attached to the side edges 59 and 61 respectively by way of bolts (not shown) inserted through apertures 81A and 83A and their top edge 81T and 83T attached to the side edges 47 and 49 respectively. The window panes 81 and 83 are formed of transparent plastic preferably a polycarbonate.

The rear frame 35 comprises a frame member 91 having an upper edge 93, a lower edge 95, two side edges 97 and 99, and two cross members 101 and 103 the latter of which are employed for structural rigidity. A transparent window pane 105 is fixedly connected to the outside of the frame member 91. The frame member 91 is formed of aluminium. The window pane 105 is formed of transparent plastic preferably a polycarbonate.

Figure 2:
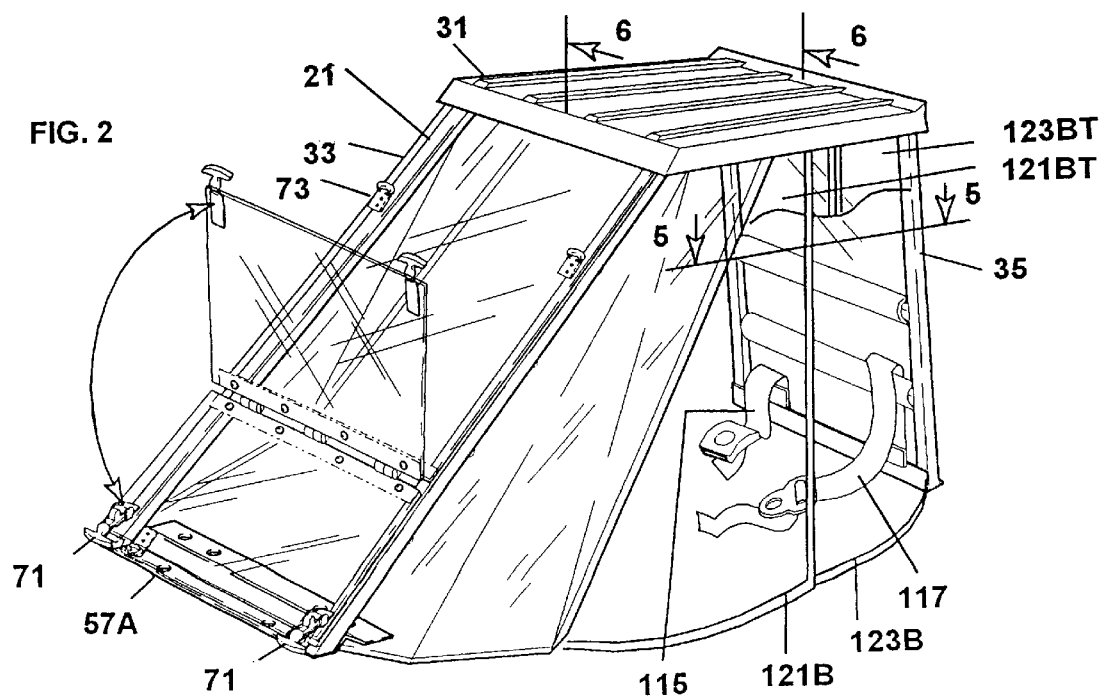
FIG. 2 is an isometric view of the canopy of FIG. 1 as seen from a left front view.
Figure 3:
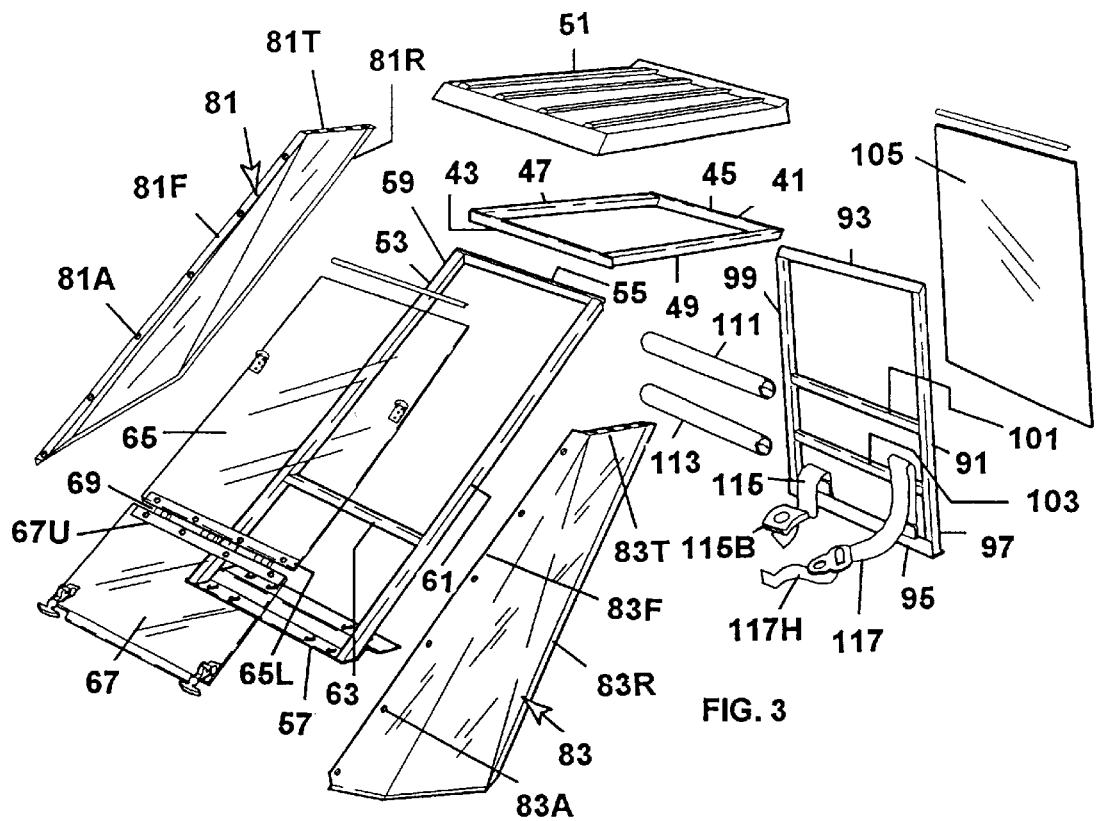
FIG. 3 is an exploded view of the canopy of FIGS. 1 and 2.

Two soft plastic tubular tubes 111 and 113 each having a split side are adapted to be fitted around the cross members 101 and 103 respectively. Two seat belt members 115 and 117 are attached to the lower edge 95 of the frame member 91, as shown in FIGS. 2 and 3. Only portions of the belt members are shown in FIG. 1. Belt member 115 has a buckle 115B at its outer end and belt member 117 has a hook 117H at its outer end. The seat belt members are adapted to extend into the space between the front and rear frames 33 and 35 for use for buckling the driver in a safe position.

The upper edge 93 of the frame member 91 is attached to the rear edge 45 of the top frame with bolts such that the plane of the rear frame 35 forms an angle of about 74 degrees with respect to the plane of the top frame 31.

Figure 6:
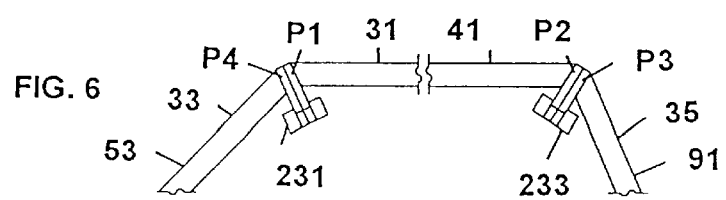
FIG. 6 is a partial cross--sectional view of FIG. 2 in outline form taken long lines 6—6 showing the manner in which the front and rear frames are attached to the top frame.

Referring to FIG. 6, frame member 41 has two plates P1 and P2 attached to its front and rear edges; frame member 91 has a plate P3 attached to its top edge; and frame member 53 has a plate P4 attached to its front edge. Bolts 231 extending through holes in plates P1 and P4 attach plates P1 and P4 together and hence attach frames 31 and 33 together. Bolts 233 extending through holes in plates P2 and P3 attach plates P2 and P3 together and hence attach frames 31 and 35 together. Three bolts 231 may be used for securing plates P1 and P4 together and three bolts 233 may be used for securing plates P2 and P3 together. These plates and bolts are not shown in FIG. 3 for purposes of clarity.

Figure 4:
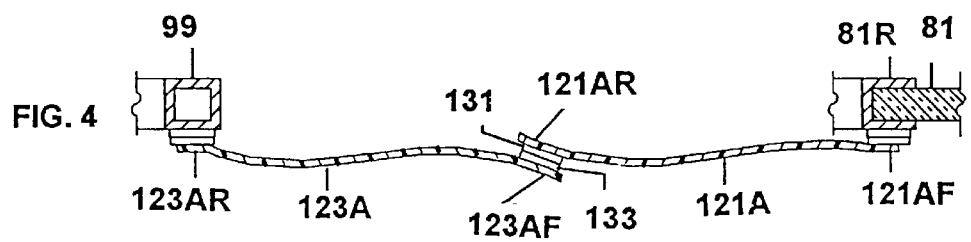
FIG. 4 is a cross-sectional view of the two flexible windows of the canopy as seen from lines 4—4 of FIG. 1.

Flexible side windows 121A and 123A have top edges 121AT and 123AT attached to the top frame edge 47 as shown in FIGS. 1 and 4. The window 121A has its front edge 121AF attached to the rear edge 81R of window 81 and the window 123A has its rear edge 123AR attached to the frame edge 99. The rear and front edges 121AR and 123AF of the windows 121A and 123A have attached thereto VELCRO® strips 131 and 133 with hook and loop fasteners for releasably attaching the rear and front edges of the windows 121A and 123A together. The windows 121A and 123A are made of suitable thin transparent plastic which is thin enough to be flexible to allow one to move the front and rear edges of the windows 121A and 123A apart to allow a person to enter or leave the vehicle.

Figure 5:
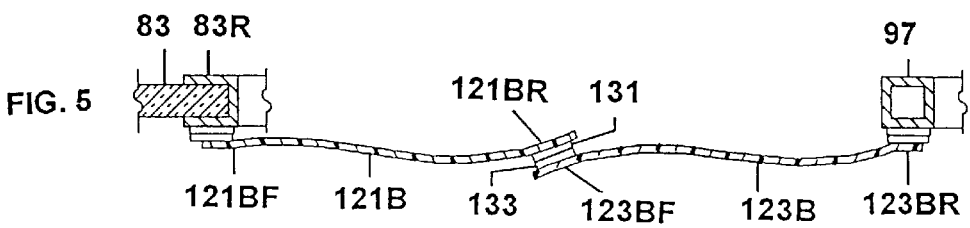
FIG. 5 is a cross-sectional view of two left side flexible windows of the canopy as seen from lines 5—5 of FIG. 2.

Flexible side windows 121B and 123B similar to windows 121A and 123A respectively are provided on the other side of the frame as shown in FIGS. 2 and 5. Their top edges 121BT and 123BT are attached to the top frame edge 49. The window 121B has its front edge 121BF attached to the rear edge 83R of the window 83 and the window 123B has its rear edge 123BR attached to the frame edge 97. The rear and front edges 121BR and 123BF of the windows 121B and 123B have attached thereto VELCRO® strips 131 and 133 with hook and loop fasteners for releasably attaching the rear and front edges of the windows 121B and 123B together.

The lower frame edge 57 of the front frame 33 is attached to the vehicle by way of bolts (not shown) inserted through apertures 57A. The lower frame edge 95 of the rear frame 35 is attached to the vehicle by way of bolts (not shown) inserted through apertures (not shown) formed through the edge 95.

Window panes 65, 67, 81 and 83 are relatively stiff members having a thickness of about 1/8 of an inch. The flexible windows 121A, 123A, 121B, and 123B preferably are formed of thin polycarbonate.

The rear and front edges of the windows 121A and 123A and of the windows 121B and 123B may be removably coupled together by means other than VELCRO®.

I claim:

1. A canopy for a motor vehicle, said canopy comprising:

a front frame, a rear frame, and a top frame, each of said front and rear frames having an upper edge, a lower edge, and two side edges, said top frame having a front edge, a rear edges and two side edges, said upper edges of said front and rear frames being coupled to said front and rear edges respectively of said top frame, with said lower edges of said front and rear frames being located forward and rearward of said top frame respectively and a space being defined between said front and rear frames, upper and lower transparent window panes each having an upper edge, a lower edges and two side edges, said upper window pane being fixedly coupled to said front frame, said lower window pane having said upper edge thereof pivotally coupled to said front frame below said lower edge of said upper pane such that said lower edge of said lower pane may pivot to a position against said lower edge of said front frame and away from said lower edge of said front frame, a transparent rear window pane fixedly coupled to said rear frame, and a safety belt comprising two flexible belt members having first ends coupled to said rear frame and second ends adapted to extend into the space between said front and rear frames.

2. The canopy of claim 1, comprising:

two forward transparent window panes each having a front edge, a rear edge, a top edges and a lower edge, each of said forward transparent window panes having said front edge thereof coupled to one of said side edges of said front frame and said upper edge thereof coupled to one of said side edges of said top frame.

3. The canopy of claim 2, further comprising:

two flexible transparent side windows with each of said side windows comprising a front side window and a rear side window each having a front edge, a rear edge, a top edge, and a bottom edge, each of said front side windows having said front edge thereof coupled to one of said rear edges of said forward transparent window panes and said top edge thereof coupled to one of said side edges of said top frame, each of said rear side windows having said rear edge thereof coupled to one of said side edges of said rear frame and said top edge thereof coupled to one of said side edges of said top frame, said front and rear side windows having said rear and front edges thereof adapted to be removably coupled together.

* * * * *